United States Patent [19]

Kato et al.

[11] 4,407,254
[45] Oct. 4, 1983

[54] INTAKE HEATING APPARATUS OF AN INTERNAL COMBUSTION ENGINE

[75] Inventors: Keigo Kato; Yosio Kuroiwa, both of Toyota, Japan

[73] Assignee: Toyota Jidosha Kabushiki Kaisha, Toyota, Japan

[21] Appl. No.: 343,342

[22] Filed: Jan. 27, 1982

[30] Foreign Application Priority Data

Oct. 5, 1981 [JP] Japan .............................. 56-157535
Oct. 5, 1981 [JP] Japan .............................. 56-157537

[51] Int. Cl.³ .......................................... F02M 31/00
[52] U.S. Cl. .................................. 123/549; 261/142; 123/545; 219/207
[58] Field of Search .................. 123/549, 552, 545; 261/142; 219/205, 206, 207

[56] References Cited

U.S. PATENT DOCUMENTS 1,472,233 10/1923 Taylor ................................. 123/549
4,327,697 5/1982 Wada .................................. 123/549
4,361,125 11/1982 Igashira .............................. 123/549
4,366,798 1/1983 Kazuyoshi .......................... 123/549

FOREIGN PATENT DOCUMENTS 55-72647 5/1980 Japan .................................. 123/549

Primary Examiner—Ronald H. Lazarus
Attorney, Agent, or Firm—Kenyon & Kenyon

[57] ABSTRACT

An intake heating apparatus of an internal combustion engine, comprising a hollow heater vessel which is placed in an intake passage of the engine and which comprises an inner pipe, an outer pipe in which said inner pipe is press-fitted, peripherally spaced PTC elements located between the inner and outer pipes, and an annular elastic electrode located between the PTC elements and the outer pipe. The improvement comprises means for preventing the PTC elements from being broken when and after the inner pipe is press-fitted in the outer pipe.

9 Claims, 16 Drawing Figures

INTAKE HEATING APPARATUS OF AN INTERNAL COMBUSTION ENGINE

The present invention relates to an apparatus for promoting the vaporization of liquid fuel in an internal combustion engine.

The low engine temperature before completion of the engien warm-up results in insufficient vaporization of the fuel supplied from the carbureter. The supply of a large quantity of fuel into the engine cylinders in the liquid state before completion of the engine warm-up results in a poorer performance than that achieved after completion of the warm-up, whereby a stable operation of the engine cannot be obtained before completion of the warm-up. Accordingly, during warm-up, an air-fuel mixture, which is richer than the air-fuel mixture used after completion of the warm-up, is supplied into the engine cylinders so as to maintain a stable engine operation. However, the supply of such a richer air-fuel mixture to the engine cylinders causes not only an increase in the amount of poisonous components, such as unburnt hydrocarbons HC and carbon monoxide gas CO in the exhaust, but also causes an increase in the fuel comsumption. Accordingly, sufficient vaporization of the liquid fuel supplied from the carburetor during engin warm-up would enable a stable engine operation to be achieved, even with a reduced air-fuel mixture. The use of such a reduced air-fuel mixture would allow control of the formation of poisonous components in the exhaust gas and a reduction in the fuel consumption. An assignee of the present invention previously proposed an intake heating apparatus for promoting vaporization of a liquid fuel during the engine warm-up, which apparatus comprises a hollow heating element vessel attached to, for example, the outlet portion of a carbureter air horn, said hollow heating element vessel including an inner pipe, an outer pipe, and a plurality of positive temperature coefficient thermistors (hereinafter referred to as "PTC elements") inserted between the inner and outer pipes, wherein the inner pipe of the hollow heating element vessel is heated by heating the PTC elements.

Since the present invention is directed to an improvement of this type of intake heating apparatus, the discussion below will first be directed to the construction of the intake heating apparatus, with reference to FIGS. 1–9 of the accompanying drawings, in which.

Figure 1:
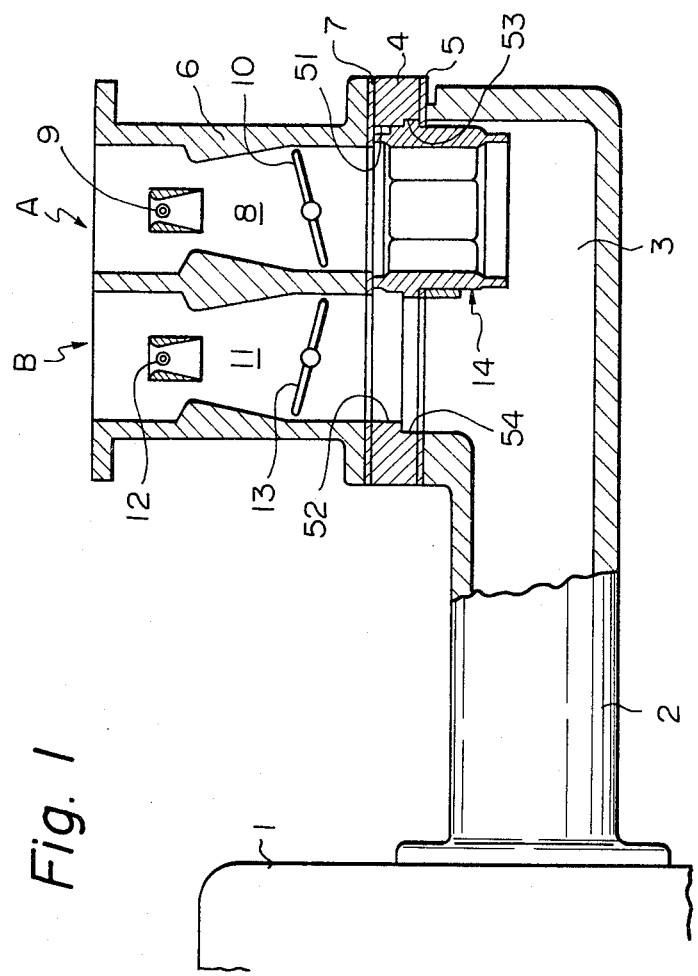
FIG. 1 is a sectional side view of the intake system of an engine according to a prior application of an assignee of this invention.
Figure 2:
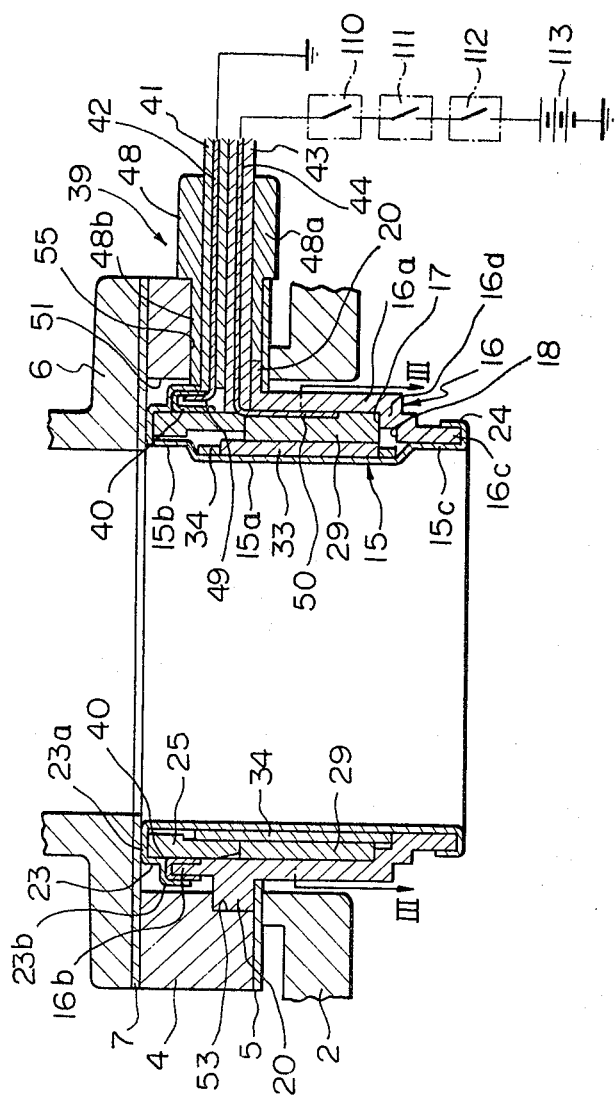
FIG. 2 is a cross-sectional side view of the heating element vessel in FIG. 1 taken along the line II—II in FIG. 3.
Figure 3:
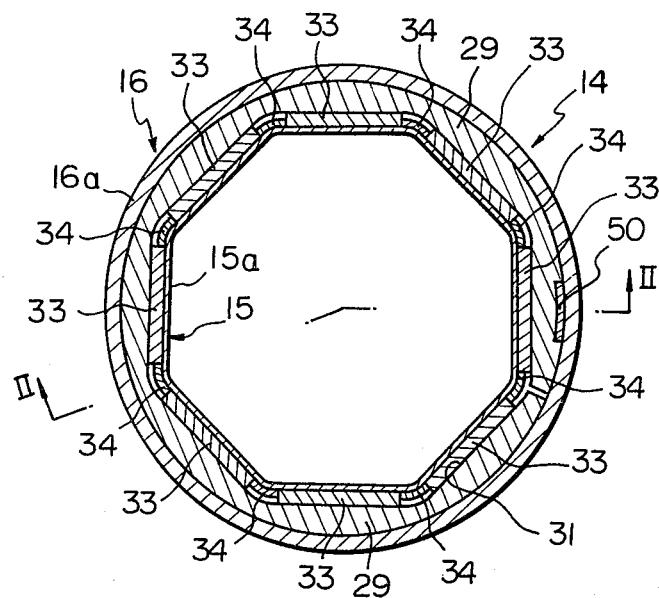
FIG. 3 is a cross-sectional plan view taken along the line III—III in FIG. 2.
Figure 4:
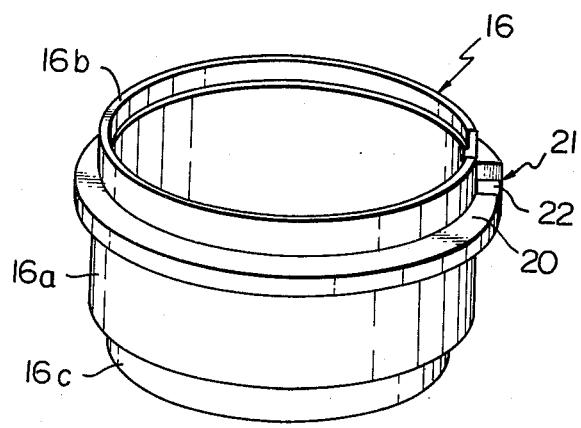
FIG. 4 is a perspective view of the outer pipe shown in FIG. 2.

In FIG. 1, reference numerals 1, 2, 3, 4, and 6 designate an engine body, an intake manifold, a collecting portion of the intake manifold 2, a heat-insulting plate of a plastic material attached onto the collecting portion 3 via a gasket 5, and a carburetor secured to the heat-insulating plate 4 via a gasket 7, respectively. The carburetor 6 has a primary carburetor A and a secondary carburetor B. The primary carburetor A is provided with a primary air horn 8, a primary main nozzle 9, and a primary throttle valve 10, and the secondary carburetor B is provided with a secondary air horn 11, a secondary main nozzle 12, and a secondary throttle valve 13. As shown in FIG. 1, a hollow heating element vessel 14 is arranged in the heat insulating plate 4 in the lower end portion of the primary carburetor A in alignment with the primary air horn 8 and is projected into the collecting portion 3. As shown in FIGS. 2 and 3, this hollow heating element vessel 14 comprises an inner pipe 15 composed of a thin metallic material and an outer pipe 16 composed of a thin plastic material. As illustrated in FIG. 4 the outer pipe 16 has an intermediate portion 16a having a uniform inner diameter, a top end portion 16b having an inner diameter slightly larger than the inner diameter of the intermediate portion 16a, and a lower end portion 16c having an inner diamter smaller than the inner diameter of the intermediate portion 16a. An inwardly descending step portion 16d (FIG. 2) is formed between the intermediate portion 16a and the lower end portion 16c, and this step portion 16d comprises a first annular shoulder 17 extending in the radial direction, and a second annular shoulder 18 extending in the radial direction and located below the first annular shoulder 17. An annular flange 20 having a rectangular section is integrally formed on the back surface of the intermediate portion 16a at a position adjacent to the top end portion 16b. Furthermore, a cut-away portion 21 (FIG. 4), extending from the top end portion 16b into the flange 20, is formed on the outer pipe 16, and a flat face, extending in the radial direction, is formed on the bottom 22 of the cut-away portion 21. As described hereinbefore, this outer pipe 16 is integrally molded from a plastic material, but the outer pipe 16 may also be formed from a metallic material.

Figure 5:
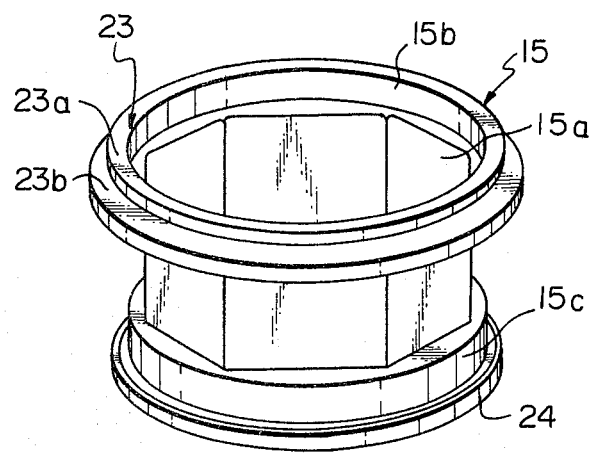
FIG. 5 is a perspective view of the inner pipe shown in FIG. 2.

As shown in FIGS. 2, 3, and 5, the inner pipe 15 has an intermediate portion (contact surface portion) 15a having an octahedral section, a cylindrical top end portion 15b, and a cylindrical lower end portion 15c. The inner diameter of the cylindrical top end portion 15b is the same as the inner diameter of the cylindrical lower end portion 15c, and the intermediate portion 15a as a whole expands inwardly from the cylindrical top end portion 15b and cylindrical lower end portion 15c. A step-like flange 23 extending outwardly is integrally formed on the top end of the cylindrical top end portion 15b. This step-like flange 23 comprises an inner flange 23a having an L-shaped section and extending outwardly beyond the top end of the cylindrical top end portion 15b and an outer flange 23b having an L-shaped section and extending outwardly beyond the tip of the inner flange 23a. Furthermore, a flange 24 having an L-shaped section and extending outwardly is integrally formed on the top end of the cylindrical lower end portion 15c, and as shown in FIG. 2, this flange 24 is fitted onto the lower end portion 16c of the outer pipe 16.

As shown in FIG. 2, an insulating ring 25, composed of a heat-resistant fluorine resin, such as polytetrafluoroethylene, or a heat-resistant rubber, such as a silicone rubber, is inserted between the inner pipe 15 and the outer pipe 16, and is fitted in the inner flange 23a of the inner pipe 15.

Figure 6:
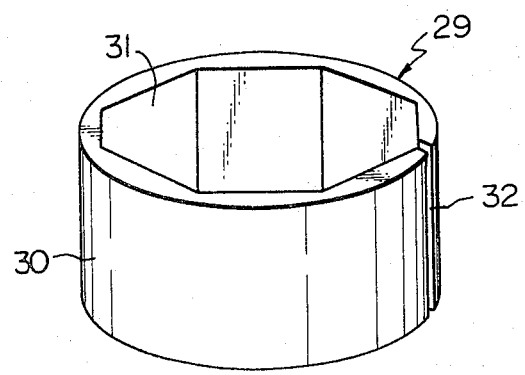
FIG. 6 is a perspective view of the elastic electrode shown in FIG. 2.

As shown in FIGS. 2 and 3, an annular elastic electrode 29 composed of graphite is inserted between the inner pipe 15 and the outer pipe 16. As shown in FIG. 6, this elastic electrode 29 has a cylindrical peripheral face 30 and an inner circumferential face 31 having an octahedral section, and is separated by a slit 32 extending in the axial direction. As is seen from FIG. 3, the elastic electrode 29 is inserted between the inner and outer pipes 15 and 16 so that respective flat faces constituting the octahedron of the inner circumferential face 31 of the elastic electrode 29 confront the corresponding flat faces constituting the octahedron of the inner pipe 15. Furthermore, the axial length of this elastic electrode 29 is shorter than the length of the intermediate portion 15a of the inner pipe 15, and the elastic electrode 29 is arranged in the region of this intermediate portion 15a of the inner pipe 15.

Figure 8:
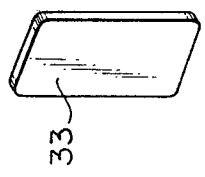
FIG. 8 is a perspective view of the PTC element.
Figure 7:
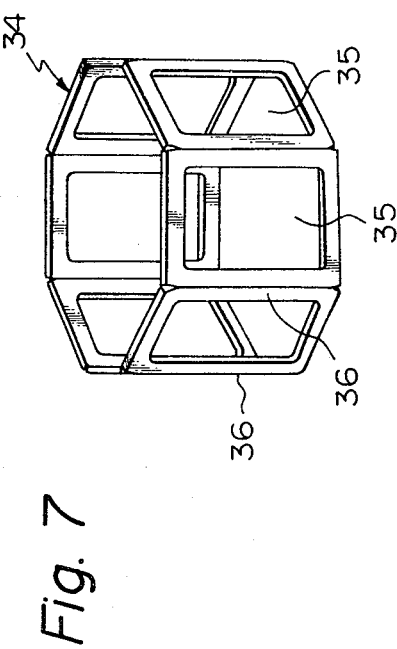
FIG. 7 is a perspective view of the insulating member shown in FIG. 2, at the time of insertion.

A PTC element 33 is inserted into each of the gaps between the flat faces of the peripheral face of the intermediate portion 15a of the inner pipe 15 and the elastic electrode 29, and furthermore, an insulating member 34, having a thickness smaller than that of each PTC element 33, is inserted to surround the peripheral walls of said PTC elements 33. The insulating member 34 is composed of belt-like asbestos which is rounded to provide an annular PTC element holder and eight holes 35 are equidistantly formed on the insulating member 34 (FIG. 7). As shown in FIG. 8, each PTC element 33 has a rectangular plate-like shape, and the holes 35 of the insulating member 34 have a contour substantially the same as that of the PTC elements 33. The holes 35 are separated from one another by ribs 36 arranged equidistantly. The respective flat faces constituting the octahedron of the insulating member 34 are arranged on the corresponding flat faces constituting the octahedron of the inner pipe 15, and the PTC elements 33 are inserted into the corresponding holes 35 of the insulating member 34.

Figure 9:
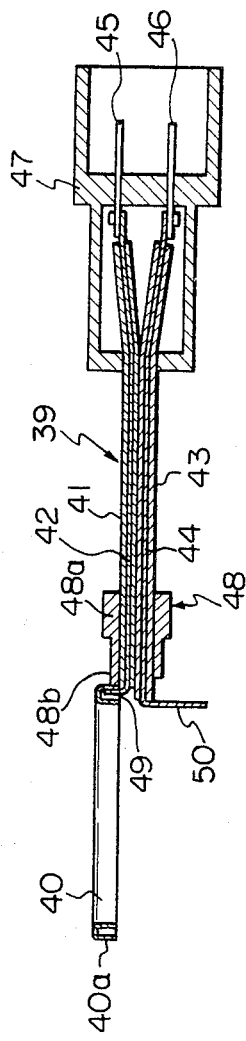
FIG. 9 is a cross-sectional side view of the electrode unit shown in FIG. 2.

An electrode unit 39, extending outwardly in the radial direction, is attached to the upper end portion of the hollow heating element vessel 14. This electrode unit 39 comprises, as shown in FIG. 9:

a metal ring 40 having a U-shaped section, a band-like negative side lead 42 covered with an insulating tube 41, a band-like positive-side lead 44 covered with an insulating tube 43, and a connector 47 provided with a pair of terminals 45 and 46. The insulating tubes 41 and 43 are overlapped and a retainer 48, formed of a rubber material, is inserted on the peripheries of the overlapped tubes 41 and 43. As shown in FIG. 9, the inner end 49 of the negative side lead 42 is upwardly bent at a right angle, and the bent inner end 49 is welded in the U-shaped section of the ring 40. The outer end of the negative side lead 42 is connected to the terminal 45 of the connector 47. The inner end 50 of the positive side lead 44 is downwardly bent in the direction opposite to the bending direction of the bent inner end portion 49 of the negative side lead 42, and the outer end of the positive side lead 44 is connected to the terminal 46 of the connector 47. As shown in FIG. 2, the U-shaped section of the ring 40 is fitted in the top end portion 16b of the outer pipe 16, and the outer flange 23b of the inner pipe 15 is fitted onto the ring 40. The bent inner end 50 of the positive side lead 44 is inserted between the intermediate portion 16a of the outer pipe 16 and the elastic electrode 29.

As shown in FIG. 1, a large-diameter hole 51 and a small-diameter hole 52, which are connected to each other, are formed on the heat insulating plate 4, and the hollow heating element vessel 14 is placed in the large-diameter hole 51. The small-diameter hole 52 is arranged in alignment with the secondary air horn 11. Grooves 53 and 54, having an L-shaped section, are formed along the entire length of the lower side portion of the inner circumferential wall face of the heat insulating plate 4 defining the large-diameter hole 51 and small-diameter hole 52, and the flange 20 integrally formed on the peripheral wall face of the outer pipe 16 is fitted in the groove 53 of the large-diameter hole 51. Further, a dovetail groove 55 (FIG. 2) is formed on the lower side wall face of the heat insulating plate 4, and the inner side portion 48b of the retainer 48 is fitted in this dovetail groove 55.

The operation of the apparatus is as follows.

The negative side lead 42 is grounded, and the positive side lead 44 is connected to a power source 113 through a temperature detecting switch 110, a neutral point voltage detecting switch 111, and an ignition switch 112. The temperature detecting switch 110 is turned on when the temperature of the engine cooling water is lower than, for example, 60° C., and is turned off when the temperature of engine cooling water exceeds 60° C. The neutral point voltage detecting switch 111 is turned off when the neutral point voltage of the engine-driven alternator is lower than a predetermined level, and is turned on when this neutral point voltage exceeds the predetermined level.

Since a large current flows at the time of starting the supply of the electric current, it is necessary that the supply of the electric current to the PTC element 33 not be started while the starter motor is actuated to start the engine. A neutral point voltage detecting switch 111 is equipped for this purpose. More specifically, while the engine is rotated by the starter motor, the neutral point voltage is low, and when the engine is rotated by its own power, the neutral point voltage is increased, the neutral point voltage detecting switch is turned on, and the supply of the electric current to the PTC element 33 is started. When the supply of the electric current to the PTC element 33 is thus started, the temperature of the PTC element is immediately elevated and, therefore, the temperature of the inner pipe 15 is immediately elevated.

When the engine is started, the majority of the liquid fuel supplied from the primary carburetor A flows down along the inner wall face of the primary air horn 8. This liquid fuel flows down along the inner wall face of the inner pipe 15. The outer pipe 16 is formed of a heat insulating material and is supported by the heat insulating plate 4. Accordingly, only a very small proportion of heat generated by the PTC element 33 escapes to the intake manifold 2 and the carburetor 6. The majority of heat generated by the PTC element 33 is used for heating the inner pipe 15. Since the inner wall face of the inner pipe 15 is covered with liquid fuel, the majority of heat generated by the PTC element 33 is used for vaporizing the liquid fuel. Furthermore, since the intermediate portion 15a of the inner pipe 15 expands inwardly from the top end portion 15b of the inner pipe 15, adhesion of fuel drops floating in the air-fuel mixture to the intermediate portion 15a of the inner pipe 15 is accelerated, and vaporization of the fuel is further promoted.

When a certain time has passed from the point of starting the engine and the temperature of engine cooling water exceeds 60° C., the temperature detecting switch 110 is turned off to stop the supply of the electric current to the PTC element 33.

As is well known, graphite has a directional property in heat conductivity, and heat conductivity in the radial direction is lower than heat conductivity in the circumferential direction. Accordingly, heat is not smoothly conducted in the radial direction in graphite, and hence, the elastic electrode 29 exerts a heat insulating action. Furthermore, as pointed out hereinbefore, the outer pipe 16 is formed of a heat insulating material, and the elastic electrode 29 has a heat insulating action. Therefore, the majority of heat generated by the PTC elements can be used for heating the inner pipe 15. Still further, since heat is smoothly conducted in the circumferential direction in graphite, the inner pipe 15 can be heated uniformly.

Figure 10:
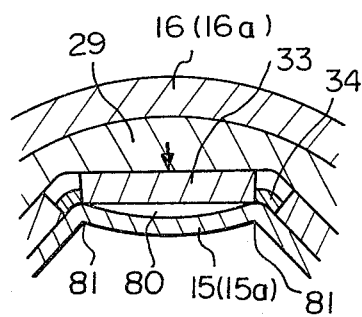
FIG. 10 is an enlarged cross-sectional view of a part of FIG. 3, showing the presence of an undersirable gap between the PTC element and the inner pipe.

In the above mentioned type of intake heating apparatus, in order to obtain a good heating coefficient of the apparatus, it is very important to provide a good contact relationship between the PTC elements 33 and the corresponding contact surface portions (intermediate portion) 15a of the inner pipe 15, which are in the shape of an octahedron (generally, a regular polygon); that is, it is very important to provide a large contact area between the PTC elements and the corresponding contact surface portions. For this purpose, the inner pipe 15 is usually made of a material having a small thickness and a high thermal conductivity. The contact surface portions (intermediate portion) 15a which are press-formed to form an octahedron are required to have a highly precise flatness. However, it is very difficult to obtain such a highly precise flatness with satisfaction, by the press-machining of the inner pipe 15. Furthermore, even if a satisfactorily precise flatness has been obtained by press-machining, the contact surface portions (intermediate portion) 15a of the inner pipe 15 tend to be bent or deformed inwardly when the inner pipe 15 is press-fitted in the outer pipe 16 during assembly of the apparatus, after the insulating member 34 with the PTC elements 33 and the elastic electrode 29 is attached to the inner pipe 15, so that gaps 80 are formed between the PTC element 33 and the inner pipe 15, as shown in FIG. 10. The presence of the gaps 80 not only decreases the contact surface area between the PTC elements 33 and the inner pipe 15, which results in a decrease of the heat transmitting coefficiency, but also increases the possibility that the PTC elements will be broken or split when external radial forces are applied to the PTC elements along the axial center lines of the PTC elements, as shown by an arrow in FIG. 10. Each PTC element 33 is always subject to a radial force by the elastic electrode 29 when and after the inner pipe is press-fitted in the outer pipe. Practically, since the PTC elements are made of a fragile material, such as ceramic, they can be easily broken under the application of a radial force thereto.

The primary object of the present invention is therefore to eliminate the above-mentioned drawbacks by providing an intake heating apparatus which can prevent the PTC elements from being broken or split and which presents a high heating coefficiency.

The invention will now be described in detail below with reference to FIGS. 11-16.

Figure 11:
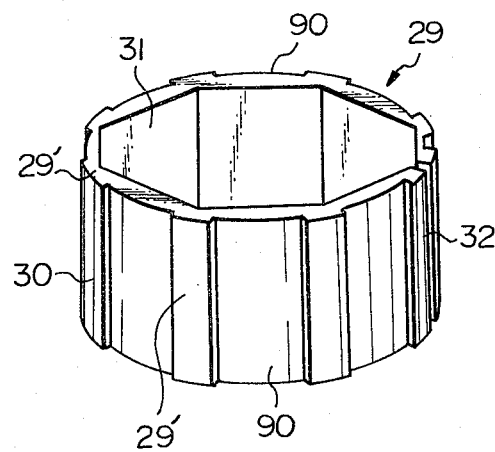
FIG. 11 is a perspective view of an elastic electrode according to the present invention.
Figure 12:
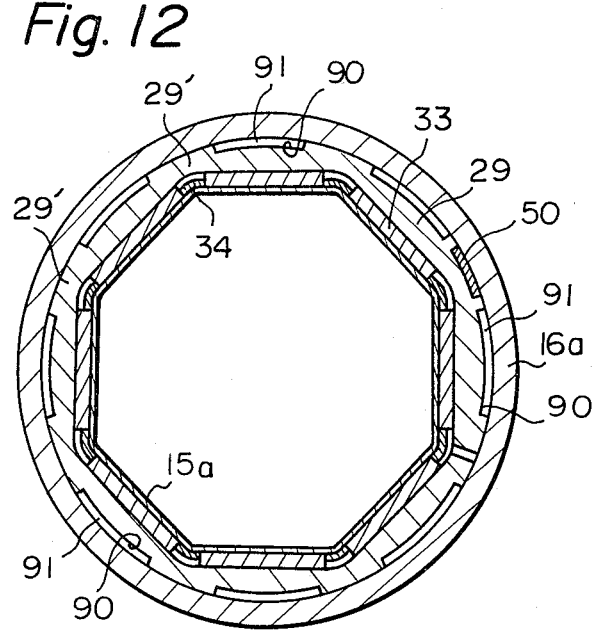
FIG. 12 is a cross-sectional plan view of a heating element vessel in which the elastic electrode in FIG. 11 is incorporated.

According to the present invention, as shown in FIG. 11, the elastic electrode 29 is provided, on its outer cylindrical periphery 30, with equidistantly spaced recesses 90. The recesses 90 are located corresponding to the PTC elements 33, i.e., to the flat planes of the polygonal inner periphery 31 of the electrode 29. Therefore, when the electrode 29 is press-fitted in the outer pipe 16 (the intermediate portion 16a thereof), there are provided spaces 91 corresponding to the recesses 90, between the electrode 29 and the outer pipe 16, as shown in FIG. 12. Thus, the axial force applied to the electrode 29, when and after the electrode 29 is press fitted in the outer pipe 16, acts only on the contact portions 29' of the electrode 29 which are in contact with the outer pipe 16 and which define therebetween the recesses 90, so that the axial force acting on the PTC elements 33 through the electrode 29 can be decreased.

Figure 13:
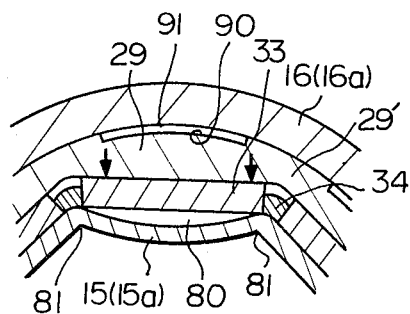
FIG. 13 is a view similar to FIG. 10, but having the elastic electrode shown in FIG. 11.

Furthermore, since the contact portions 29', which serve as load supporting portions, are located at positions corresponding to the apexes of the regular polygon of the polygonal inner surface 31 of the electrode 29, the PTC elements 33 are not subject to radial forces along their axial center lines and are subject to radial forces only at or in the vicinity of their side edges, as designated by arrows in FIG. 13. Therefore, even if the intermediate portion 15a of the inner pipe 15 is bent or deformed inwardly, as shown in FIG. 13 when the inner pipe 15 is press-fitted in the outer pipe 16, there is no possibility that the PTC elements 33 will become broken or split, since the distortion or deformation of each PTC element 33 becomes maximum and minimum when the load acts on the center and the side edges thereof, as shown in FIGS. 10 and 13, respectively.

Furthermore, in the arrangement shown in FIG. 10, the press-fitting load, which is produced when the inner pipe 15 is press-fitted in the outer pipe 16, acts on the entire inner pipe 15 in such a way that the inner pipe 15 is deformed or distorted in the radial and inward directions, since the electrode 29 cannot become deform in the radial and outward directions because of the presence of the outer pipe 16. Whereas, in the arrangement of the present invention shown in FIG. 13, since the spaces 91 are provided between the electrode 29 and the outer pipe 16, the press-fitting load can be partly absorbed by the spaces 91. That is, the spaces 91 absorb part of the distortion or deformation of the electrode 29, so that no distortion or deformation of the inner pipe 15 occurs in radial and inward direction. This contributes to providing a good close contact relationship between the PTC elements 33 and the inner pipe 15, thus resulting in an increase of the heating coefficiency of the apparatus.

Still furthermore, even if the press-fitting load is not peripherally uniform, such a non-uniform load can be effectively absorbed by the recesses 90 or the spaces 91, and, accordingly, no strict fit tolerance between the components, such as the electrode, PTC element, inner pipe, outer pipe, etc. is required.

The inner end 50 of the lead 44 can be incorporated in the contact portions 29' of the electrode 29.

Figure 14:
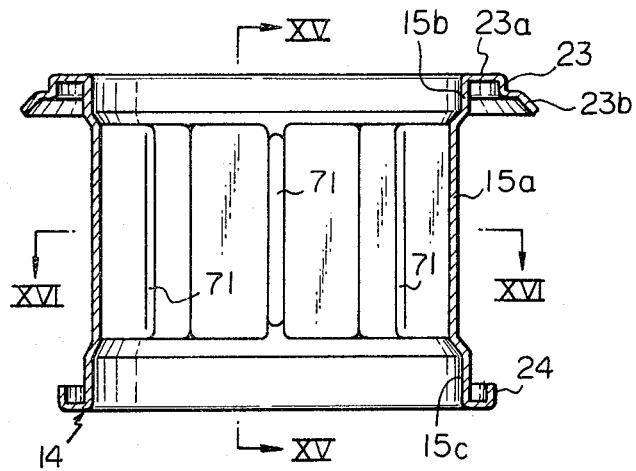
FIG. 14 is a sectional side view of an inner pipe according to the present invention.
Figure 15:
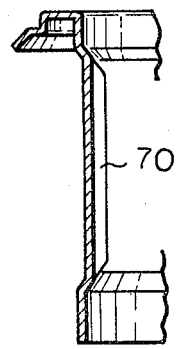
FIG. 15 is a sectional view taken along the line XV—XV in FIG. 14.
Figure 16:
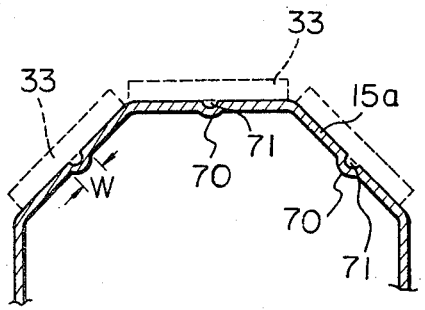
FIG. 16 is a sectional view taken along the line XVI—XVI in FIG. 14.

FIGS. 14–16 show another embodiment of the present invention, in which the improvement is directed to the inner pipe 15, rather than the electrode 29. In this embodiment, the inner pipe 15 is provided, on its intermediate portion (contact surface portion) 15a, with fin-like or strip-like projections 70 extending substantially along the axial center lines of the flat planes of the polygon. The projections 70 serve as reinforcing ribs which increase the rigidity of the flat planes of the polygon of the inner pipe 15, so that the inner pipe 15 cannot become deformed in the inward and radial directions, as shown in FIG. 10, when the inner pipe 15 is press-fitted in the outer pipe 16. Furthermore, when the inner pipe 15 is press-formed to form the polygonal intermediate portion 15a, recesses 71 defined by the projections 70 serve as stress concentration portions which absorb a possible bend or distortion of the flat planes of the polygon. Therefore, the stress concentration portions, i.e., the recesses 71, enable flat surface machining with a high precision and with a small press load by a press machine.

According to the arrangement shown in FIGS. 14–16, since the PTC elements 33 come into close surface contact with the corresponding flat surfaces of the intermediate portion 15a at a large contact surface area, there is no possibility that the PTC elements will become split or broken, even if they are subjected to radial forces, as shown in FIG. 10.

Preferably, the width W (FIG. 16) of the projections 70 is as small as possible, so as to provide a large contact surface area between the PTC elements and the inner pipe 15.

It is also possible to combine the two embodiments shown in FIGS. 11 and 14.

We claim:

1. An intake heating apparatus of an internal combustion engine comprising a hollow heater vessel, which is placed in an intake passage between a fuel supply means and a cylinder of the engine to heat an intake, said hollow heater vessel comprising: an inner pipe having therein a mixture passage which is aligned with the intake passage; an outer pipe in which said inner pipe is press-fitted; a plurality of periphery spaced PTC elements located between said inner pipe and said outer pipe; and an annular elastic electrode which is connected to an external electrical power supply and is located between the PTC elements and the outer pipe, so that the electrode comes into contact with the PTC elements, whereby the inner pipe is heated by heating the PTC elements to heat the intake passing through the heater vessel, wherein the improvement comprises means for preventing the PTC elements from being broken when and after the inner pipe is press-fitted in the outer pipe.

2. An apparatus according to claim 1, wherein said preventing means comprises recesses provided on the outer periphery of the electrode to define spaces between the electrode and the outer pipe.

3. An apparatus according to claim 2, wherein said recesses axially extend throughout the axial length of the electrode.

4. An apparatus according claim 3, wherein said electrode comprises a regular polygonal inner periphery consisting of a series of flat planes with which the corresponding PTC elements contact, and wherein said recesses are located corresponding to the flat planes of the polygon.

5. An apparatus according to claim 4, wherein said electrode comprises load supporting portions which are provided on the outer periphery of the electrode and which are located between said recesses, said electrode being in contact with the outer pipe by the load supporting portions.

6. An apparatus according to claim 5, wherein said load supporting portions are equidistantly and peripherally spaced from one another and are located at the apexes of the regular polygon of the inner periphery of the electrode.

7. An apparatus according to claim 1, wherein said preventing means comprises projections which are provided on the inner periphery of the inner pipe and which define recesses on the outer periphery of the inner pipe.

8. An apparatus according to claim 7, wherein said inner pipe has a regular polygonal shape in cross section consisting of a series of flat planes, and wherein said projections are located at the centers of the flat planes.

9. An apparatus according to claim 8, wherein said projections axially extend along the center lines of the flat planes and throughout the axial length of the flat planes.

* * * * *

UNITED STATES PATENT AND TRADEMARK OFFICE
CERTIFICATE OF CORRECTION

PATENT NO. : 4,407,254
DATED : October 4, 1983
INVENTOR(S) : Keigo Kata and Yosio Koroiwa It is certified that error appears in the above—identified patent and that said Letters Patent is hereby corrected as shown below:

On the title page
Change the Name of the Assignee from:

"Toyota Jidosha Kabushiki Kaisha" to

--Toyota Jidosha Kogyo Kabushiki Kaisha--.

Signed and Sealed this

Twenty-seventh Day of December 1983

[SEAL]

Attest:

GERALD J. MOSSINGHOFF

Attesting Officer     Commissioner of Patents and Trademarks